C. J. WOOD.
REAMER AND CUTTER.
APPLICATION FILED MAY 12, 1919.
1,376,790.
Patented May 3, 1921.
2 SHEETS—SHEET 2.
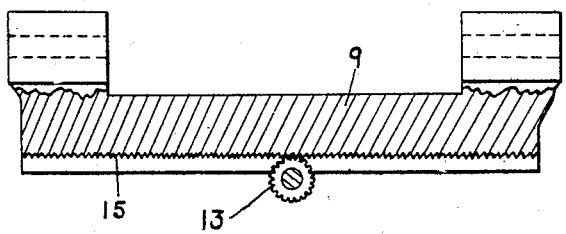
Fig. 2.
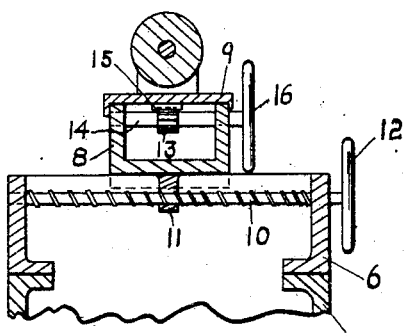
Fig. 3.
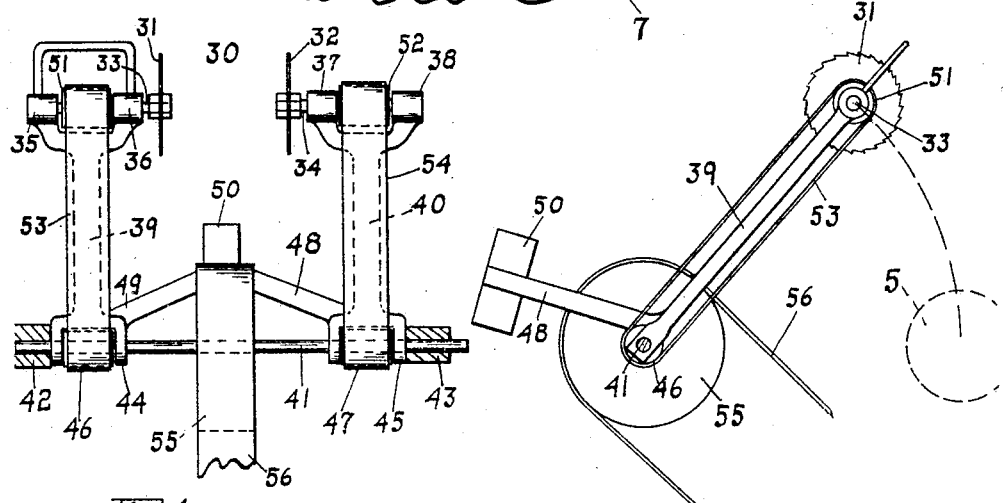
Fig. 4.
Fig. 5.
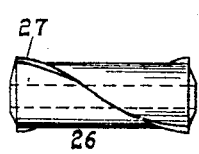
Fig. 6.
Inventor
Casimir J. Wood,
By Harry C. Schroeder
Attorney

UNITED STATES PATENT OFFICE.

CASIMIR J. WOOD, OF SAN FRANCISCO, CALIFORNIA.

REAMER AND CUTTER.

1,376,790.  Specification of Letters Patent.  Patented May 3, 1921.

Application filed May 12, 1919. Serial No. 296,677.

*To all whom it may concern:*

Be it known that I, CASIMIR J. WOOD, a citizen of the United States, residing at San Francisco, in the county of San Francisco and State of California, have invented certain new and useful Improvements in Reamers and Cutters, of which the following is a specification.

My invention is an improved reamer and cutter, particularly useful for reaming and cutting sleeves for wooden pipe joints.

My invention is illustrated in the accompanying drawing which forms a part of this specification and the appended claims.

Referring to the drawing:

Fig. 2 is an enlarged longitudinal section of the upper and longitudinal slide of the arbor.

Fig. 3 is a cross section of the arbor on line 3—3 of Fig. 1.

Fig. 4 is a side elevation of one form of the sleeve severing means.

Fig. 5 is an end view of said cutter.

Fig. 6 is a side view of the reaming tool used in connection with the cutter means shown in Figs. 4 and 5.

Fig. 7 is a longitudinal section through a portion of my invention, illustrating the cutting and reaming operation thereof.

Fig. 8 is a sectional view of one of the chuck shoes.

Fig. 9 is a front view of one of the chuck jaws and chuck shoes, showing how the shoe is held in the jaw.

Fig. 10 is a sectional view of means for locking the siding members 8 and 9 of the arbor in adjusted position.

Figure 1:
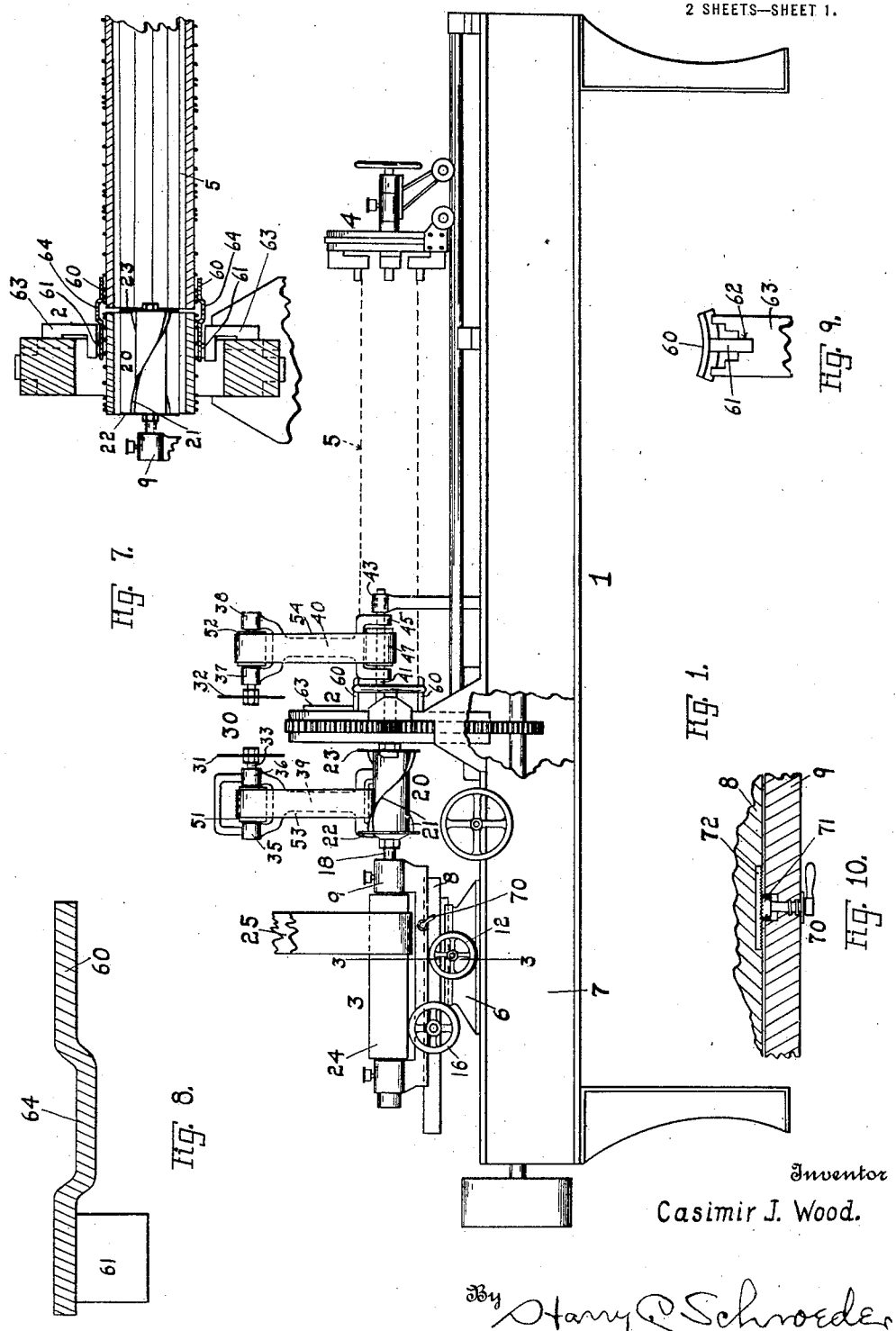
Figure 1 is a side elevation of my invention as embodied in a lathe.

In the drawings, 1 indicates a lathe including a chuck 2, an arbor 3 and a tail piece 4. The work comprising a wooden tube 5, from which sleeves for wooden pipe joints are made, is held in said chuck and tail piece as shown in dotted lines in Fig. 1.

The arbor 3 may be of the usual construction comprising a base 6 mounted on the lathe frame 7, a transverse slide 8 mounted on said base, and a longitudinal slide 9 mounted on said transverse slide. The slide 8 is moved transversely by a screw 10, journaled in base 6, engaging a lug 11 depending from said slide. A hand wheel 12 is secured on the end of screw 10 for turning the screw. The slide 9 is moved longitudinally by a pinion 13, secured on shaft 14 journaled in the slide, and a rack 15 on the under side of the slide, which meshes with the pinion. A hand wheel 16 is secured on the outer end of shaft 14 for turning said shaft and pinion.

On a spindle 18, journaled on the slide 9, is mounted a combined reaming and cutting tool 20 on which are spiral reaming blades 21 and end disk cutters 22 and 23 of greater diameter than said reaming blades. A pulley 24 is secured on spindle 18 over which passes a belt 25 for rotating the pulley spindle and tool 20. The tool 20 is of less diameter than the interior of the tube 5 to be reamed and cut.

A reaming tool 26 has reaming blades 27 but no end disk cutters. This tool is particularly useful for reaming sleeves of small diameter.

A cutting element 30 is mounted on the frame 7 for cutting sleeves reamed out by the reaming tool 26, which element will be described in detail. Two disk cutters 31 and 32 are secured on spindles 33 and 34 respectively, which spindles are journaled in bearings 35 and 36, and 37 and 38 respectively on the upper end of arms 39 and 40, which arms are fulcrumed at their lower ends on a shaft 41 journaled in bearings 42 and 43 on the frame 7. The lower end of arms 39 and 40 are formed with forked bearings 44 and 45 through which the shaft 41 extends, and pulleys 46 and 47 are secured on said shaft between said forked bearings respectively. The arms 39 and 40 are connected together at their lower ends by a yoke 48, said yoke and arms forming a unitary cutter frame 49 and a counter-weight 50 is secured to the outer rear portion of said yoke for normally holding the cutter ends of said arms and the cutters 31 and 32 elevated above the work 5, as shown in Fig. 5. Pulleys 51 and 52 are respectively secured on spindles 33 and 34 between the bearings 35 and 36 and the bearings 37 and 38. Belts 53 and 54 extend over pulleys 46 and 51 and pulleys 47 and 52. A pulley 55 is secured on the shaft and is driven in any suitable manner through a belt 56 which passes over the pulley, whereby the cutters 31 and 32 are rotated through the medium of shaft 41, pulleys 46 and 47, belts 53 and 54, pulleys 51 and 52, and spindles 33 and 34 respectively.

Chuck shoes 60 have lugs 61 which fit in notches 62 in the jaws 63 of rotary chuck 2, whereby the shoes are held in the jaws for gripping the work forwardly of the jaws as shown in Fig. 7. The shoes are formed with an offset 64.

In operation, the tool 20 is introduced into the end of the sleeve 5 by turning the hand wheel 16 and moving the slide 9 forwardly through the medium of pinion 13 and rack 15. The spindle 18 is then rotated, carrying with it the combined cutter and reamer 20, and likewise the chuck tool is rotated at a slower speed than that of the spindle or in an opposite direction thereto.

Upon moving the tool to one side, by turning the hand wheel 12, the cutters 22 and 23 first cut through the work and cut a sleeve off the end of the work, and then the blades 21 ream out the inner surface of said sleeve, thus cutting and reaming a sleeve. The offsets 64 in the shoes 60 permit the cutter 23 to cut through the work without engaging the shoes. When the sleeve is cut from the work, the rear portion of the shoes 60 grip and hold the sleeve in the chuck, while the forward portion of said shoes hold the rear end of the work, thus preventing the work from dropping when a sleeve is cut off the rear end thereof. In some forms of work, it is desirable to use the cutter specifically shown in Figs. 4 and 5 and the reaming tool shown in Fig. 6.

Upon swinging the frame 49 down the cutters 31 and 32 cut off a sleeve from the work 5. The frame and cutters are returned to their normal elevated position by counter weight 50. The reaming operation, by means of the reamer 26, may be made either before or after the sleeve section is severed from the tube 5, but in all events the severed sleeve section is held in the chuck during the reaming operation.

A screw clamp 70 mounted in slide 9 has a serrated clamping member 71 for engaging a serrated plate 72 on the slide 8 to lock the slide 9 and the tool 20 against longitudinal movement, thus preventing the tool from shifting longitudinally with relation to the work.

Having described my invention, I claim:

1. In a reamer and cutter, means for holding the work, a reaming and cutting tool, means for moving the tool longitudinally into the work, and means for moving the tool transversely to ream out the work and to cut off a reamed sleeve from the work.

2. In a reamer and cutter, means for holding the work, a reaming and cutting tool, including a reaming cutting edge, and end disk cutters, means for moving the tool longitudinally into the work, and means for moving the tool transversely to ream out and to cut off a reamed sleeve from the work.

3. In a machine of the character described, a rotary chuck, shoes in the chuck for holding the work in position, a rotary tool of less diameter than the interior of the work and having cutting blades on the ends thereof and an intermediate reaming portion of less diameter than said blades, means for introducing the tool into the work, and means for moving the tool into engagement with the interior surface of the work, whereby the section of the work between the cutting blades is severed and the interior of the section reamed out while the section is being held in said chuck.

4. In a machine of the character described, a rotary chuck, shoes in the chuck for holding the work in position, a rotary tool of less diameter than the interior of the work and having cutting blades on the ends thereof and an intermediate reaming portion of less diameter than said blades, means for introducing the tool into the work and means for moving the tool into engagement with the interior surface of the work, said shoes having outwardly offset portions to receive the cutting blades when they cut through the work, whereby a section of the work between the cutting blades is severed and the end of the work is held in position by said shoes.

In testimony whereof I affix my signature.

CASIMIR J. WOOD.